US007614562B2

(12) United States Patent  (10) Patent No.: US 7,614,562 B2
Motoi  (45) Date of Patent: Nov. 10, 2009

(54) BAR CODE READER WITH MULTIPLE BAR CODE READING STATIONS

(75) Inventor: Yuichi Motoi, Saitama (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 229 days.

(21) Appl. No.: 11/299,879

(22) Filed: Dec. 12, 2005

(65) Prior Publication Data

US 2007/0131773 A1    Jun. 14, 2007

(51) Int. Cl.
G06K 7/10    (2006.01)
G06K 9/22    (2006.01)

(52) U.S. Cl. ............. 235/472.01; 235/454; 235/462.01; 235/462.45

(58) Field of Classification Search ............ 235/462.01, 235/472.01, 454, 462.45
See application file for complete search history.

(56) References Cited

U.S. PATENT DOCUMENTS 5,365,049 A * 11/1994 Peng .................... 235/462.22
6,062,473 A * 5/2000 Blalock et al. ............. 235/381
6,119,943 A * 9/2000 Christy ...................... 235/468
2004/0026513 A1 * 2/2004 Stockhammer ........ 235/462.43

FOREIGN PATENT DOCUMENTS

JP    1997-326004 A    12/1997
JP    1998-320822 A    12/1998
JP    1999-7490 A    1/1999
JP    2002-123791 A    4/2002

OTHER PUBLICATIONS

International Search Report Oct. 25, 2005.

* cited by examiner

Primary Examiner—Thien M. Le
Assistant Examiner—April A Taylor
(74) Attorney, Agent, or Firm—Kaplan Gilman & Pergament LLP

(57) ABSTRACT

A system and method are disclosed in which a bar code reader may include an image capture device; and at least two bar code reading stations, the image capture device being able to read bar code data from any of the bar code reading stations. The two bar code reading stations may be configured for reading bar code data from different bar code data storage media types. The first bar code reading station may be configured to receive a passive bar code data storage medium and the second bar code reading station may be configured to receive an active bar code data storage medium.

16 Claims, 3 Drawing Sheets

BAR CODE READER WITH MULTIPLE BAR CODE READING STATIONS

BACKGROUND OF THE INVENTION

The present invention relates in general to symbol reading devices and in particular to bar code reading devices.

As shown in FIG. 1 an existing bar code reader 10 typically includes an image capture device 110 and a bar code reading station 120 at which a bar code data storage medium may be located. Modern bar code readers may read data either from passive bar code data storage media, which may use actively powered displays, such as Personal Digital Assistants (PDAs) or cell phones, or from passive bar code data storage media which may have bar code data printed thereon, such as credit cards or printed tickets. There is no way to know for sure which type of medium will be used by a user to store the bar code to be read.

SUMMARY OF THE INVENTION

One or more embodiments of the present invention provide a system and method in which a bar code reader may include an image capture device; and at least two bar code reading stations, the image capture device being able to read bar code data from any of the bar code reading stations. The two bar code reading stations may be configured for reading bar code data from different bar code data storage media. The first bar code reading station may be configured to receive a passive bar code data storage medium and the second bar code reading station may be configured to receive an active bar code data storage medium.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
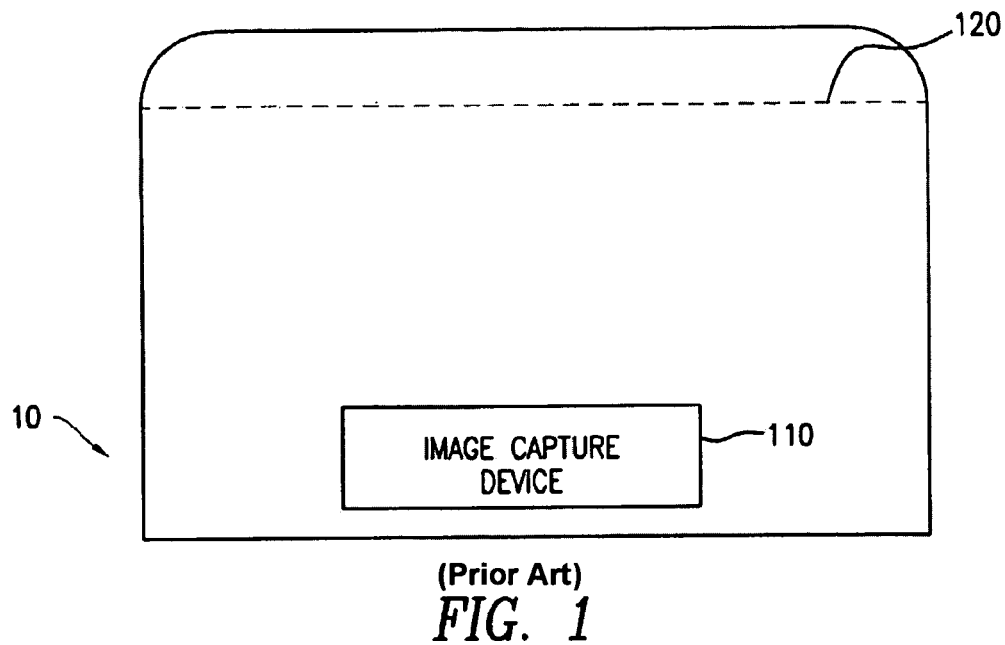
FIG. 1 is a partly elevational view and partly sectional view of an existing bar code reader.
Figure 2:
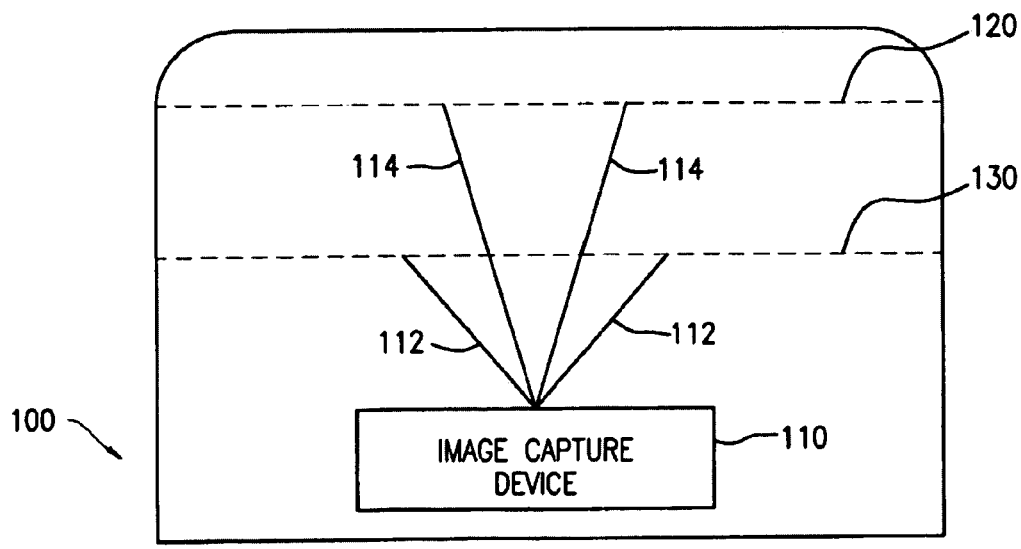
FIG. 2 is a partly elevational view and partly sectional view of a bar code reader in accordance with one or more embodiments of the present invention.

FIG. 2 is a partly elevational view and partly sectional view of a bar code reader 100 in accordance with one or more embodiments of the present invention. In one or more embodiments, bar code reader 100 may include image capture device 110, bar code reading station 120, and bar code reading station 130. Image capture device 110 may employ a focal plane denoted by lines 112 when reading data from bar code reading station 130 and may employ a focal plane denoted by lines 114 when reading data from bar code reading station 120.

In one or more embodiments, the presence of a bar code data storage medium at bar code reading station 120 may cause image capture device 110 to read bar code data from bar code reading station 120. Similarly, the presence of a bar code data storage medium at bar code reading station 130 may cause image capture device 110 to read bar code data from station 130.

Preferably, the removal of a bar code data storage medium from bar code reading station 130 and the placement of a bar code data storage medium at reading station 120 causes image capture device 110 to transition from reading data from bar code reading station 130 to reading data from bar code reading station 120. Preferably, reversing the pattern of bar code data storage media placement from that discussed above causes image capture device to transition in the reverse direction, from reading data from bar code reading station 120 to reading data from bar code reading station 130. The above-discussed system and method preferably enables one or more embodiments of the present invention to service more than one reading station and more than one type of bar code data storage medium using a single bar code reader, thus providing superior convenience while using less space than when using prior art approaches.

The above-referenced transition may be accomplished by changing one or more operating characteristics of image capture device 110. In one or more embodiments, the transition may be accomplished by changing one or more optical characteristics of image capture device 110. For example, image capture device 110 may change the focal length used for image capture when transitioning between the different bar code reading stations. However, other optical characteristics may be modified to enable image capture device 110 to transition between different sources of bar code data, and all such variations are intended to be included within the scope of the present invention.

In one or more alternative embodiments, the above-referenced transition may be accomplished by changing one or more mechanical aspects of image capture device 110, including but not limited to the positioning and/or orientation thereof.

Figure 3:
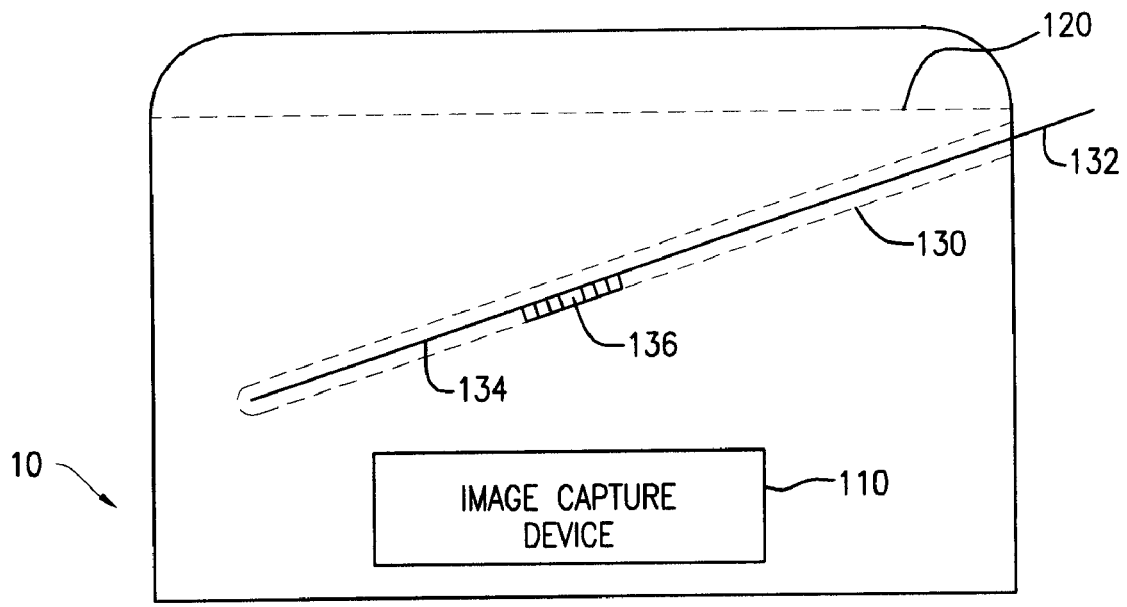
FIG. 3 is a partly elevational view and partly sectional view of a bar code reader having a passive bar code data storage medium located therein in accordance with one or more embodiments of the present invention.

FIG. 3 is a partly elevational view and partly sectional view of bar code reader 100 having passive bar code data storage medium 132 located therein in accordance with one or more embodiments of the present invention. FIG. 3 shows an embodiment in which bar code reading station 130 is not generally parallel to the upper surface of image capture device 100 but which is otherwise similar to the embodiment of FIG. 2. It will be appreciated that the present invention is not limited to any particular orientation of bar code reading station 130 (or of bar code reading station 120) with respect to image capture device 110. In the embodiment of FIG. 3, bar code reading station 130 preferably includes a slot configured to receive a bar code data storage medium. It will be appreciated that bar code reading station 130 is not limited to this configuration and may assume a wide range of shapes and sizes other than that shown in FIG. 3.

In the embodiment of FIG. 3, bar code data storage medium 132 is preferably located within bar code reading station 130. Bar code data storage medium 132 preferably includes display surface 134 for displaying bar code 136. Storage medium 132 is preferably a passive medium such as a credit card, identification card (such as a driver's license), paper ticket, currency or other medium that preferably does not include a powered display. Display surface 134 is preferably a surface of preferably passive storage medium 132 suitable for displaying bar code 136. Thus, for instance, where storage medium 132 is a credit card, display surface 134 may be a portion of a surface of the credit card suitable for displaying bar code 136. Where storage medium 132 is a ticket, display surface 134 is preferably a portion of the surface of the ticket suitable for displaying bar code 136. In the case of passive bar code data storage medium 132, bar code 136 may be printed on a surface of storage medium 132. However, the present invention is not limited to employing printing for presenting printed bar codes on storage media, and other technologies for presenting bar code 136 on storage medium 132 may be employed.

Bar code 136 preferably includes bar code data readable by image capture device 110. Bar code 136 may include one-dimensional and/or two-dimensional bar code data. Both of these data types are known in the art, and are therefore not discussed further in this disclosure.

In one or more embodiments, image capture device 110 may be prompted to read bar code 136 on storage medium 132 within bar code reading station 130 by the placement of storage medium 132 in bar code reading station 130. However, in other embodiments, image capture device 110 may be activated by other means, such as by using a switch (not shown) or by external input.

Figure 4:
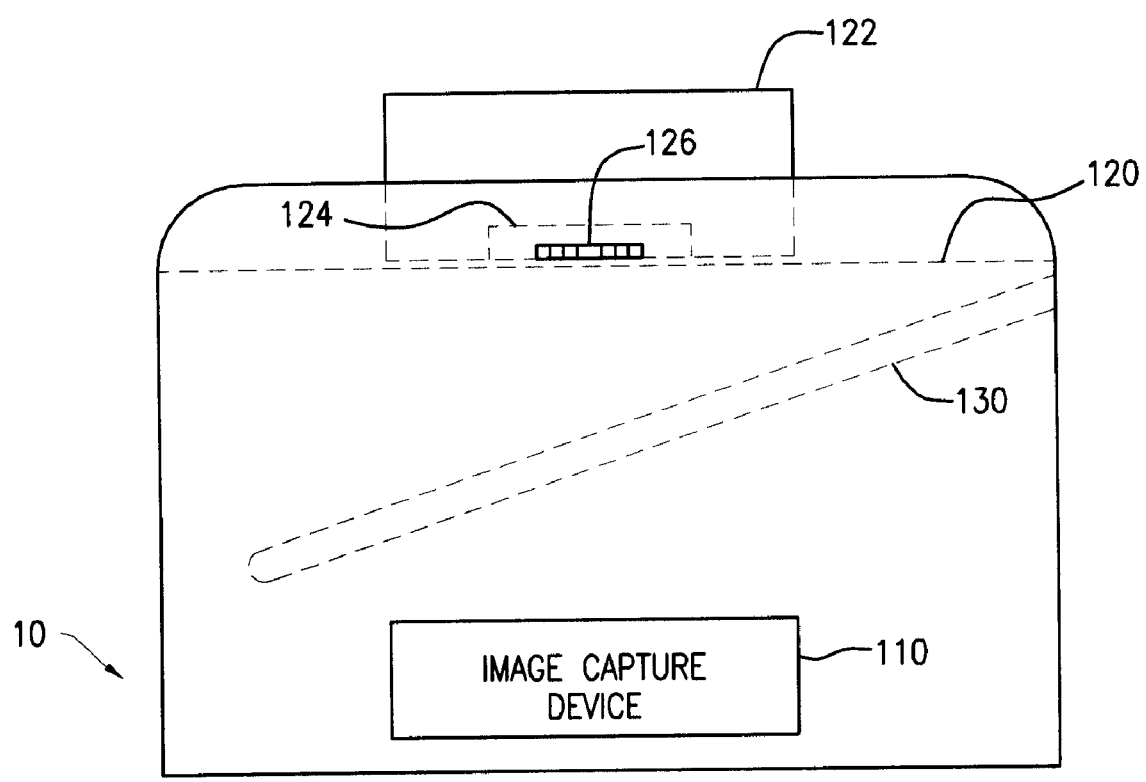
FIG. 4 is a partly elevational view and partly sectional view of a bar code reader having an active bar code data storage medium located thereon in accordance with one or more embodiments of the present invention.

FIG. 4 is a partly elevational view and partly sectional view of bar code reader 100 having an active bar code data storage medium 122 located thereon in accordance with one or more embodiments of the present invention. The embodiment shown in FIG. 4 differs from that of FIG. 3 in that bar code data storage medium 132 is no longer within bar code reading station 130, and active bar code data storage medium 122 is shown at bar code reading station 120.

In one or more embodiments including that shown in FIG. 4, bar code data storage medium 122 may be placed at bar code reading station 120 so as to be readable by image capture device 110. Storage medium 122 preferably includes display 124 which is preferably suitable for displaying bar code 126.

In one or more embodiments, storage medium 122 is preferably an active device such as a PDA, cell phone, or other portable communication and/or computing device. Display 124 is preferably an electronic display such as a liquid crystal display (LCD), or other form of computerized display. Display 124 is preferably configured to be able to display bar code 126 such that image capture device 110 may read bar code data therefrom. Bar code 126 may include one-dimensional bar code data and/or two-dimensional bar code data, as discussed earlier herein in connection with bar code 136.

In one or more embodiments, image capture device 110 may be prompted to read bar code 126 on preferably active storage medium 122 at bar code reading station 120 by the placement of storage medium 122 at bar code reading station 120. However, in other embodiments, image capture device 110 may be activated by other means, such as, for instance, through the use of a switch (not shown) or using an external input.

While the above description is directed to embodiments having two bar code reading stations, any number of reading stations may be employed. Although convenience and efficiency may be provided by deploying different bar code data storage media at different bar code reading stations, the invention is not so limited. Thus, in one or more embodiments, two or more bar code reading stations on bar code reader 100 could be configured to receive the same type of bar code data storage medium.

The figures depict embodiments in which the presence of storage medium 132 may block direct access by image capture device 110 to storage medium 122, where both data storage media are present at their respective bar code reading stations 130, 120. However, in alternative embodiments, data storage media need not obscure each other in this manner. Moreover, the relative locations of bar code reading stations 130 and 120 are not limited to the spatial relationship between the two stations shown in FIGS. 2-4.

The above discussion is directed to embodiments in which the selection of the bar code reading station (120 or 130) from which image capture device 110 will read data from is determined by the placement of a bar code data storage medium at one of the bar code reading stations 120, 130. However, this selection may be made by other means. For example, external input could be used to specify the bar code reading station from which bar code reader 100 will read data. Alternatively, a switch (not shown) that either part of or that is connected to bar code reader 100 may be used to select which bar code reading station data will be read from. In still other alternative embodiments, a default bar-code reading station could be established from which image capture device 110 reads data unless all circumstances direct image capture device 110 to read data from another bar code reading station. Such mechanisms may be beneficially employed where bar code data storage media are simultaneously present at two or more bar code reading stations within bar code reader 100.

The image capture device may be a laser scanner, a Charge Coupled Device (CCD) or any other suitable type of device, including digital or analog cameras. Moreover the bar codes may be one or two dimensional, or the images to be read and captured by the image capture device 10 may include other types of codes. Additionally, the device may be configurable to capture different types of symbols. It is also noted that the device can be manufactured such that when a first image is read from reading station 120, a first type of code is read, but when the image capture device changes to read from reading station 130, a different type of code is read.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A bar code reader comprising
   an image capture device;
   at least two bar code reading stations, said image capture device able to read bar code data from any of said bar code reading stations;
   said bar code reading stations are configured to receive different bar code data storage media types; and
   a first said bar code reading station is configured to receive a passive bar code data storage medium and a second said bar code reading station is configured to receive an active bar code data storage medium.

2. The bar code reader of claim 1 wherein said passive data storage medium comprises one of the group comprising a credit card, an identification card, and a ticket.

3. A bar code reader comprising:
   an image capture device
   at least two bar code reading stations, said image capture device able to read bar code data from any of said bar code reading stations;

said bar code reading stations are configured to receive different bar code data storage media types; and
one bar code data storage medium comprises a computing device.

4. The bar code reader of claim 3 wherein said computing device comprises one of a personal digital assistant and a cell phone.

5. The bar code reader of claim 3 wherein said image capture device is operable to read data from a first bar code reading station when a passive bar code data storage medium is at said first bar code reading station.

6. The bar code reader of claim 3 wherein said image capture device is operable to read data from a second bar code reading station when an active bar code data storage medium is at said second bar code reading station.

7. The bar code reader of claim 3 wherein said image capture device is operable to transition from reading data from one of said bar code reading stations to reading data from the other of said bar code reading stations when a bar code data storage medium configured for said other bar code reading station is positioned at said other bar code reading station.

8. The bar code reader of claim 7 wherein said transition is accomplished by adjusting at least one optical characteristic of said image capture device.

9. The bar code reader of claim 8 wherein said at least one optical characteristic comprises focal length.

10. The bar code reader of claim 7 wherein said transition is accomplished by adjusting at least one mechanical aspect of said image capture device.

11. The bar code reader of claim 10 wherein said at least one mechanical aspect includes at least one of position of said image capture device and orientation of said image capture device.

12. A method comprising:
providing an image capture device within a bar code reader; and
providing at least two bar code reading stations within said bar code reader, said image capture device able to read data from any of said bar code reading stations;
reading data from a first of said bar code reading stations, by said image capture device, when a first bar code data storage medium is present at said first station; and
reading data from a second of said bar code reading stations, by said image capture device, when a second bar code data storage medium is present at said second station; and
transitioning from reading data from one of said first and second stations to reading data from the other of said first and second stations when a data storage medium corresponding to said other station is present at said other station;
wherein said transitioning comprises:
adjusting at least one operating characteristic of said image capture device.

13. The method of claim 12 wherein the transitioning comprises changing the focal length of the image capture device.

14. A method comprising:
providing an image capture device within a bar code reader; and
providing at least two bar code reading stations within said bar code reader, said image capture device able to read data from any of said bar code reading stations;
reading data from a first of said bar code reading stations, by said image capture device, when a first bar code data storage medium is present at said first station; and
reading data from a second of said bar code reading stations, by said image capture device, when a second bar code data storage medium is present at said second station; and
transitioning from reading data from one of said first and second stations to reading data from the other of said first and second stations when a data storage medium corresponding to said other station is present at said other station;
wherein said transitioning comprises:
adjusting at least one optical characteristic of said image capture device.

15. The method of claim 14 wherein said at least one optical characteristic comprises focal length.

16. A method comprising:
providing an image capture device within a bar code reader; and
providing at least two bar code reading stations within said bar code reader, said image capture device able to read data from any of said bar code reading stations;
reading data from a first of said bar code reading stations, by said image capture device, when a first bar code data storage medium is present at said first station; and
reading data from a second of said bar code reading stations, by said image capture device, when a second bar code data storage medium is present at said second station; and
transitioning from reading data from one of said first and second stations to reading data from the other of said first and second stations when a data storage medium corresponding to said other station is present at said other station;
wherein said transitioning comprises:
adjusting at least one mechanical characteristic of said image capture device.

* * * * *